United States Patent
Meeker

[11] Patent Number: 5,494,126
[45] Date of Patent: Feb. 27, 1996

[54] APPARATUS AND METHOD FOR ATTACHING A MOTORIZED WHEEL TO A WHEELCHAIR

[76] Inventor: Galen L. Meeker, 14855 W. 58th Ave., Golden, Colo. 80403

[21] Appl. No.: 252,907
[22] Filed: Jun. 2, 1994
[51] Int. Cl.⁶ .................................................. B62M 7/14
[52] U.S. Cl. .................. 180/13; 180/907; 280/324.1
[58] Field of Search ......................... 180/13, 12, 11, 180/907, 23, 65.1; 280/304.1, 250.1

[56] References Cited

U.S. PATENT DOCUMENTS

| | | | |
|---|---|---|---|
| 2,892,506 | 6/1959 | Slater | 180/214 |
| 3,213,957 | 10/1965 | Wrigley | 180/214 X |
| 3,387,681 | 6/1968 | Rabjohn | 180/13 |
| 3,921,744 | 11/1975 | Benoit et al. | 180/13 |
| 4,019,597 | 4/1977 | Carmichael | 180/11 |
| 4,386,672 | 6/1983 | Coker | 180/13 |
| 4,403,673 | 9/1983 | Ball | 180/214 |
| 4,503,925 | 3/1985 | Palmer et al. | 180/13 |
| 5,016,720 | 5/1991 | Coker | 180/13 |
| 5,050,695 | 9/1991 | Kleinwolterink, Jr. | 180/13 |
| 5,135,063 | 8/1992 | Kropf | 180/13 |
| 5,244,051 | 9/1993 | Wu | 280/304.1 X |

FOREIGN PATENT DOCUMENTS

| 2505652 | 11/1982 | France | 180/907 |
|---|---|---|---|
| 4274986 | 9/1992 | Japan | 180/907 |

Primary Examiner—Kevin T. Hurley
Attorney, Agent, or Firm—Holland & Hart

[57] ABSTRACT

An apparatus and method for attaching a motorized wheel to a wheelchair including a mounting frame operatively connected to the motorized wheel, the frame having a laterally-extending cylindrical member, and a mounting bracket operatively connected to a frame of the wheelchair, the bracket having an open slot for receiving the cylindrical member of the mounting frame, the slot defining an interior cam surface which is open on the front side thereof and enclosed on the bottom, back and top sides thereof. The frame has means for adjusting the width thereof to accommodate a variety of different wheelchairs. The mounting frame has a second laterally-extending cylindrical member which is a slidable pin for selective engagement with the mounting bracket to attach the motorized wheel to the wheelchair.

34 Claims, 8 Drawing Sheets

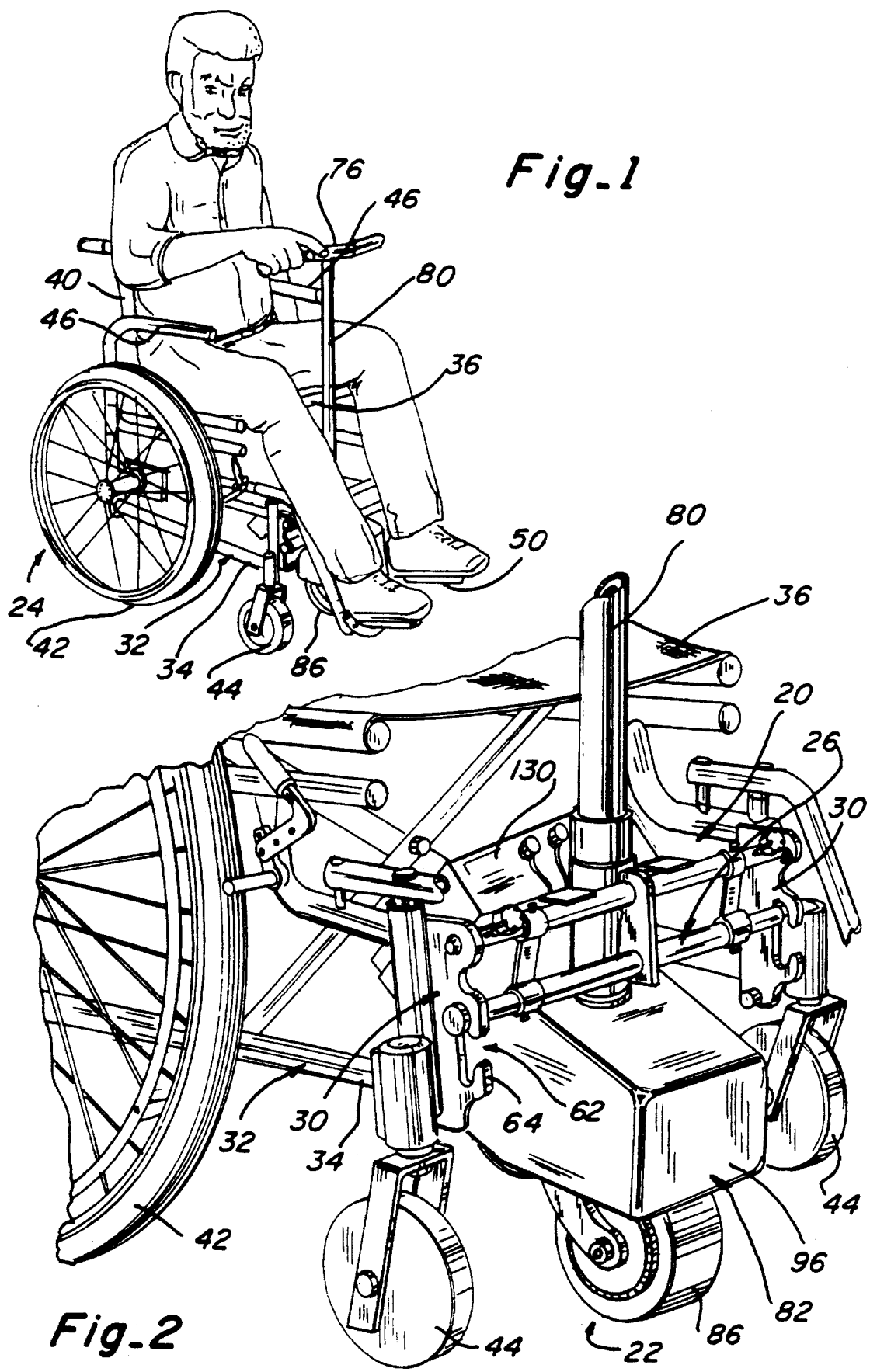

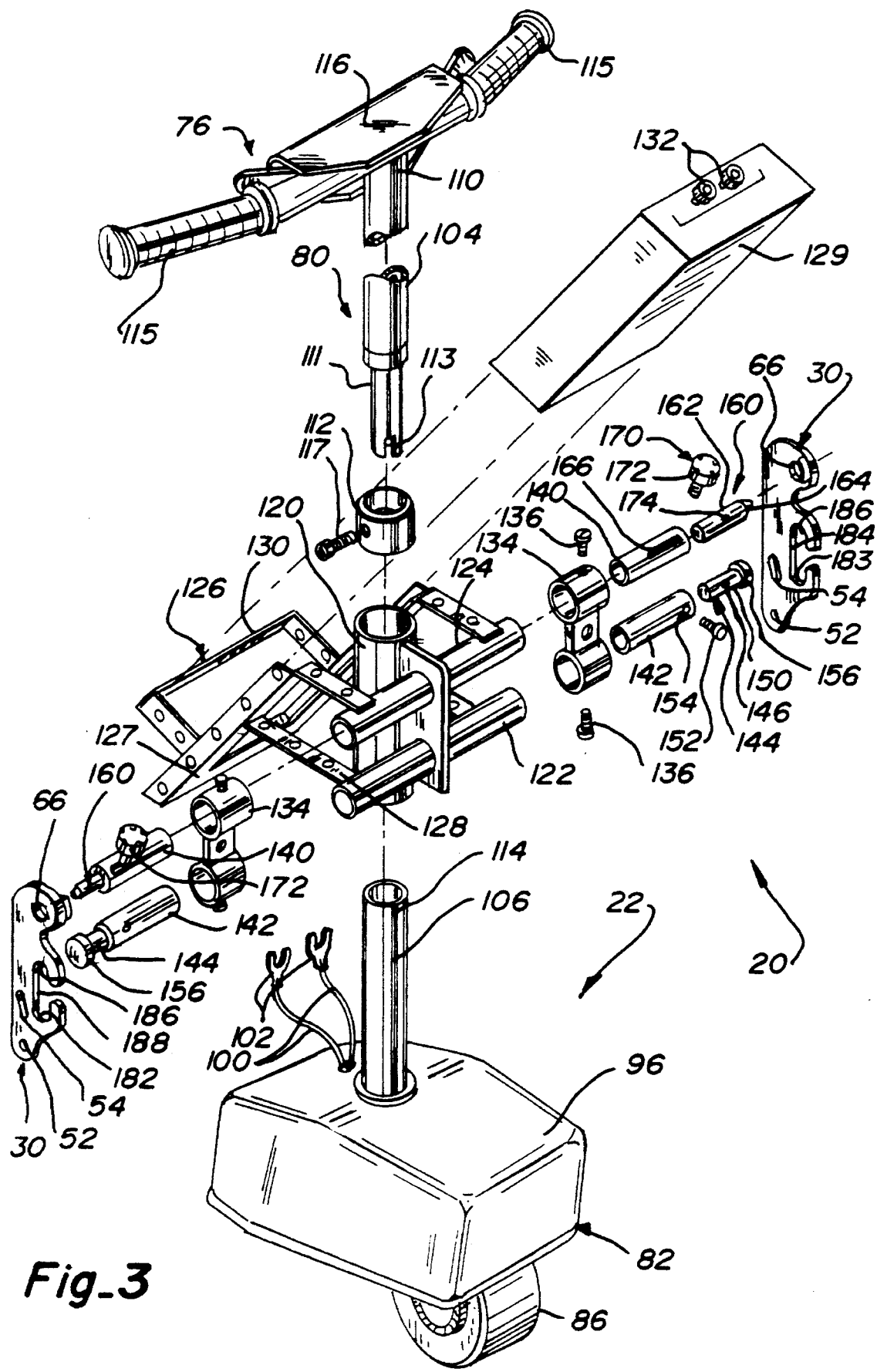
Fig_3

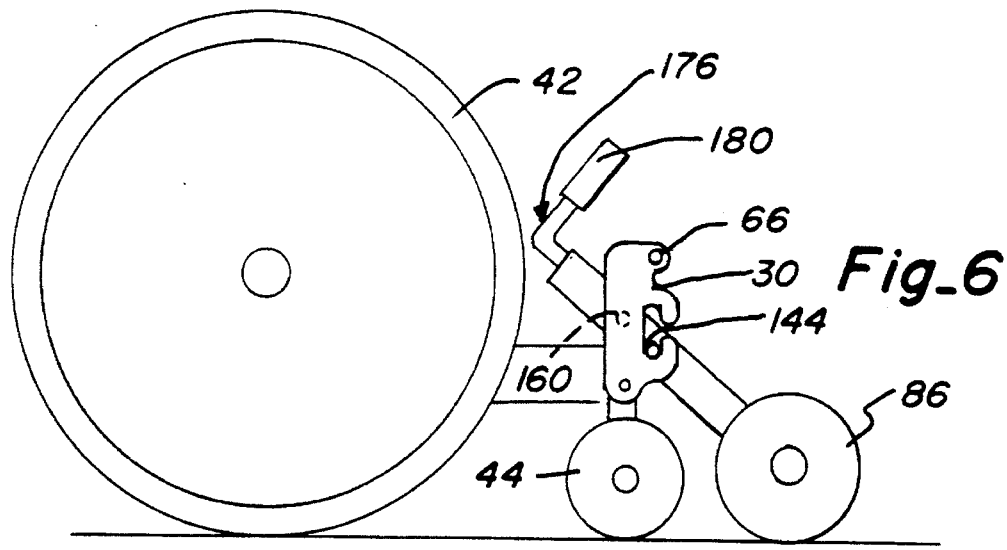
Fig_6
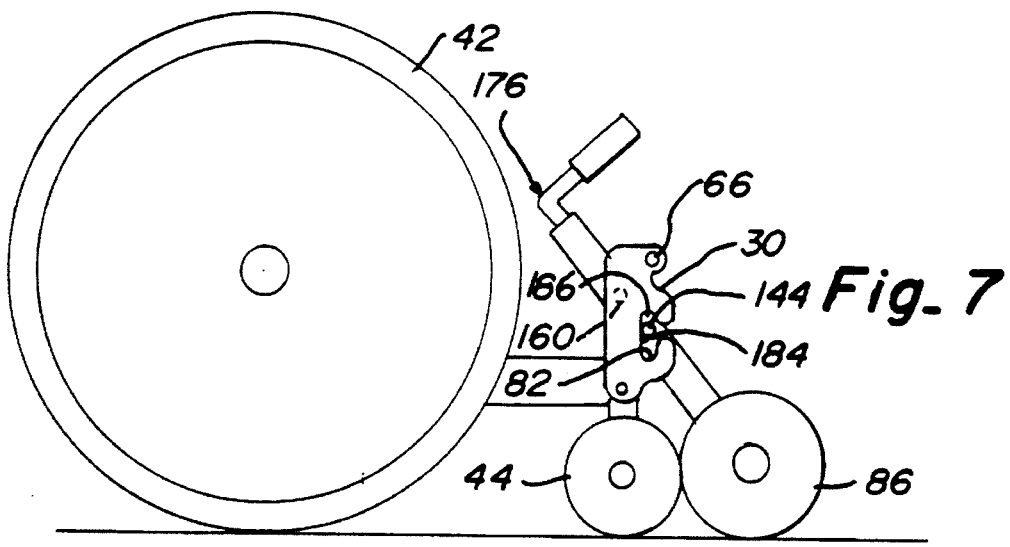
Fig_7
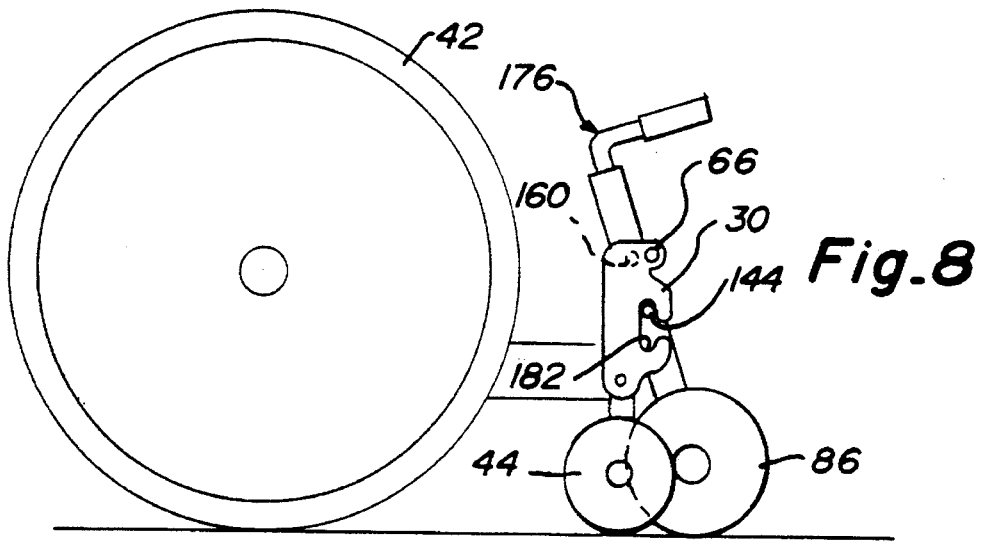
Fig.8

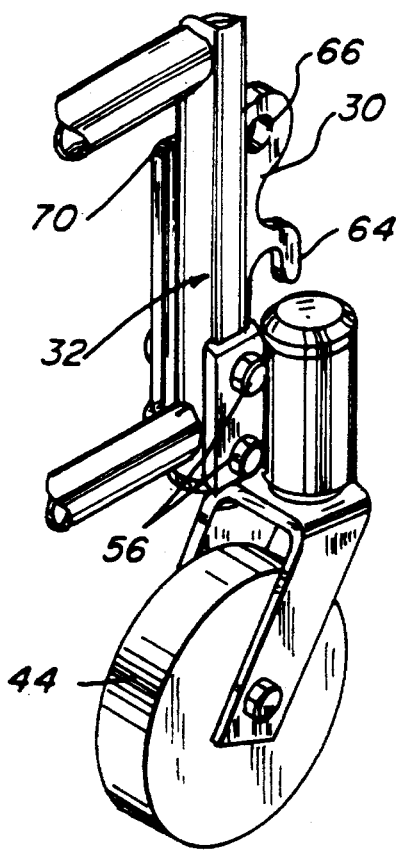
Fig._12
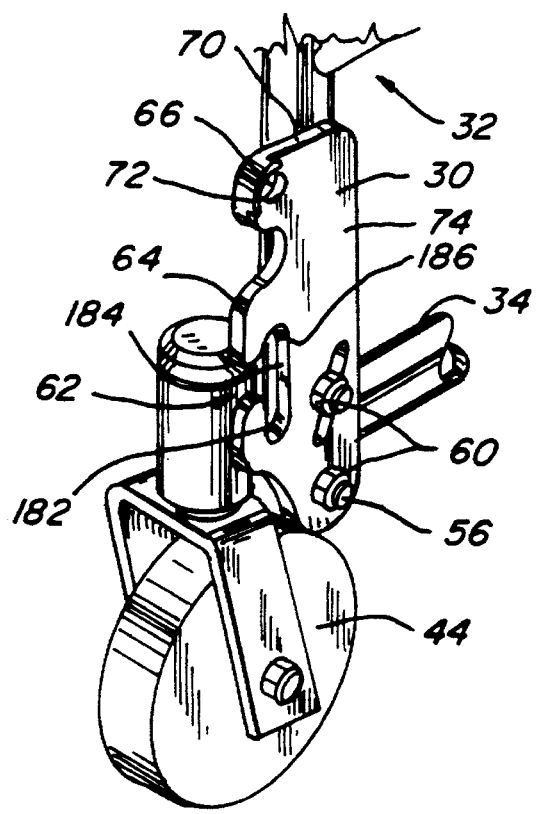
Fig._13
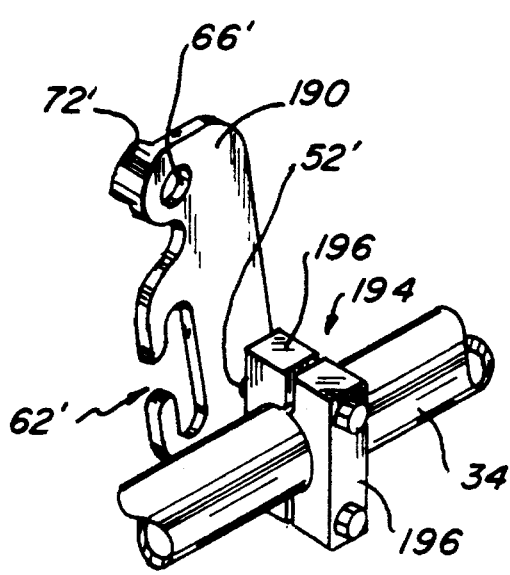
Fig._14
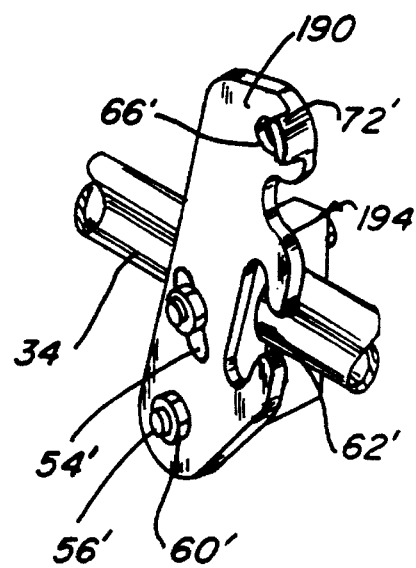
Fig._15

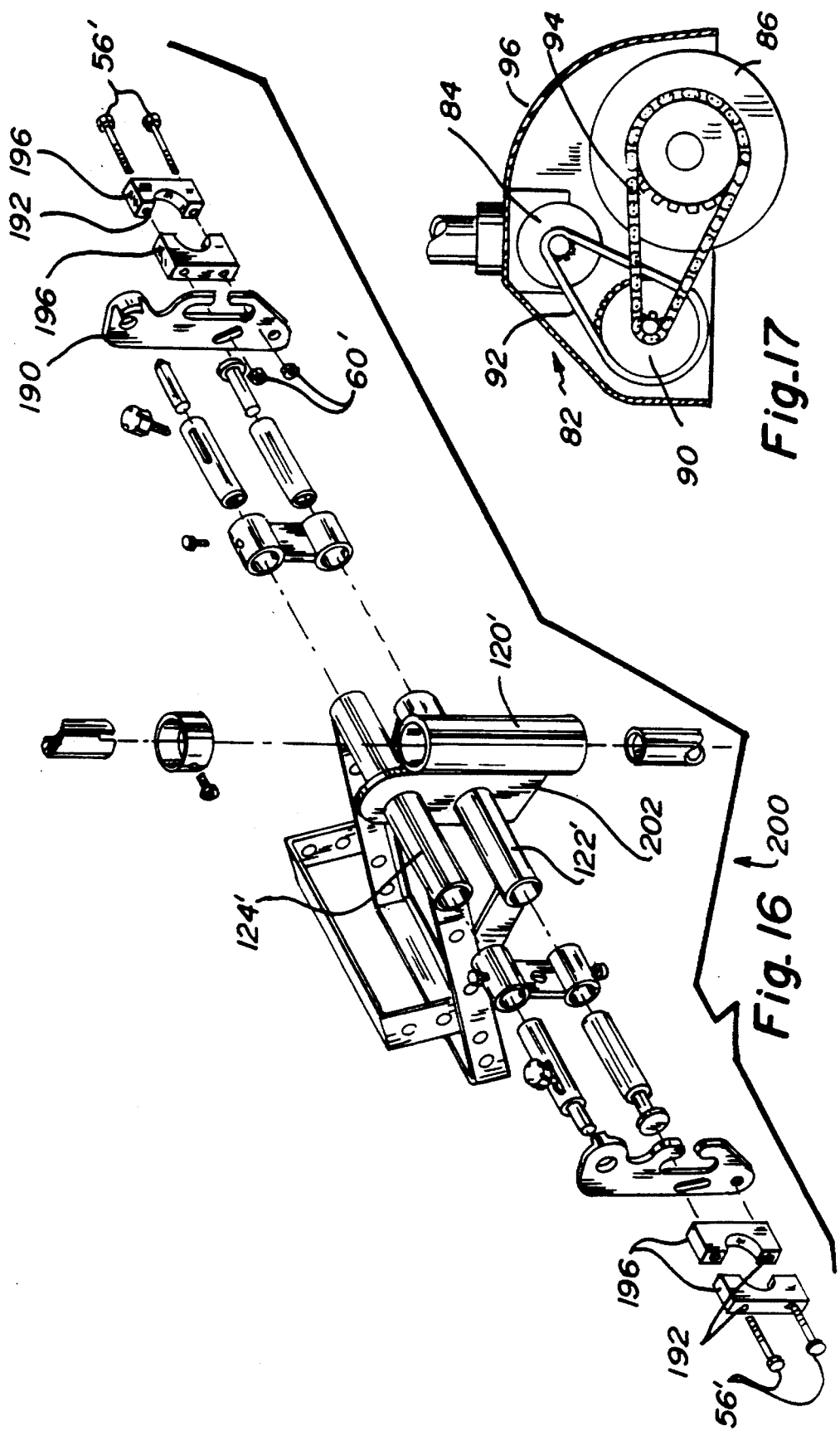

APPARATUS AND METHOD FOR ATTACHING A MOTORIZED WHEEL TO A WHEELCHAIR

The invention relates to motorized wheelchairs and more particularly to an apparatus and method for attaching a motorized driven wheel to a manually-operated wheelchair.

BACKGROUND OF THE INVENTION

There are a variety of types of motorized wheelchairs which are known. These include three-wheel wheelchairs having a pair of rear wheels and a front wheel. With this arrangement, there are examples of both rear-wheel-drive and front-wheel-drive chairs. Alternatively, four-wheel motorized wheelchairs are also available. With this arrangement, the larger rear wheels are normally the driven wheels and the smaller front wheels are normally idler wheels. One major drawback of most three-wheeled and four-wheeled wheelchair arrangements is the fact that the motor and drive apparatus are permanently installed on the wheelchair. This results in high cost, excessive weight and a wheelchair which cannot be easily collapsed to be transported.

For these and other reasons, motorized attachments for standard wheelchairs have been developed. However, these attachments have suffered from the drawbacks of being overly complex and heavy so that the occupant or user of the wheelchair cannot easily connect and disconnect the motorized attachment to the wheelchair while in the chair.

For example, U.S. Pat. No. 5,016,720 issued to Coker, discloses a battery-powered steerable electric drive unit for detachable connection to a conventional wheelchair. The unit includes a clamp for receiving and being connected to a bolt extending from the frame underneath the wheelchair in a position inaccessible to the user.

U.S. Pat. No. 3,921,744 issued to Benoit et al. discloses a detachable drive means for a wheelchair that is manipulable by the occupant but is heavy and complex. The connecting means includes ramps that guide laterally-sliding pins toward their sockets and rotatable cams received in vertical slots at the forward ends of the wheelchair arm rests.

U.S. Pat. No. 4,503,925 issued to Palmer et al. discloses a steerable motorized power unit constructed for detachable coupling to a wheelchair. Coupling pins are provided with mounting plates which can be fixably clamped to the chair frame to engage with a downwardly opening recess formed in a member of the detachable power unit. However, this arrangement is also heavy and cumbersome.

In order to address these and other problems and to achieve an improved method and apparatus for attaching a motorized wheel to a wheelchair, the following invention has been developed.

SUMMARY OF THE INVENTION

The apparatus for attaching a motorized wheel to a wheelchair includes a mounting frame operatively connected to the motorized wheel and a mounting bracket operatively connected to the frame of the wheelchair, wherein the bracket defines an open slot for receiving a laterally-extending cylindrical member of the mounting frame. The slot defines an interior cam surface and is open on the front side thereof and enclosed on the bottom, back and top sides thereof. The mounting frame and motorized wheel can be rotated so that the cylindrical member bears against the interior cam surface of the mounting bracket and lifts a front wheel of the wheelchair off the ground.

Another aspect of the present invention includes a method for mounting a motorized wheel to a frame of a wheelchair including the first step of positioning the motorized wheel relative to the wheelchair so that a first laterally-extending cylindrical member of a mounting frame attached to the motorized wheel engages with an interior cam surface of a mounting bracket attached to the wheelchair. The motorized wheel and mounting frame are then pivoted about the first cylindrical member until a second cylindrical member of the mounting frame is aligned with and is in position to engage with a receptacle of the mounting bracket on the wheelchair frame. The mounting frame is then engaged with the mounting bracket to attach the motorized wheel to the wheelchair.

Other aspects of the present invention include the open slot in the mounting bracket having a C-shape, a width adjusting means in the mounting frame for selectively varying and adjusting the width of the frame to accommodate a variety of differently-sized wheelchairs, and the second cylindrical member being a selectively slidable pin within the mounting frame.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

FIG. 1 is an isometric view of a standard wheelchair with a detachable motorized unit attached to the wheelchair by the apparatus of the present invention.

FIG. 2 is an enlarged isometric view of the attachment apparatus shown in FIG. 1.

FIG. 3 is an exploded view of the attachment apparatus shown in FIG. 1 along with selected portions of the detachable motorized unit.

FIG. 6 is a schematic of the apparatus shown in FIG. 4 showing initial placement of the mounting frame into a C-shaped opening in the mounting bracket.

FIG. 7 is a schematic of the apparatus shown in FIG. 4 showing the mounting frame after being moved relative to the mounting bracket by actuation of an installation handle.

FIG. 8 is a schematic of the apparatus shown in FIG. 4 showing the mounting frame moved further relative to the mounting bracket so that a fixed pin of the mounting frame bears against a top edge of the C-shaped opening in the mounting bracket.

FIG. 12 is an isometric view of a portion of the apparatus shown in FIG. 2, showing the attachment of the mounting bracket to the frame of the wheelchair.

FIG. 13 is another isometric view of the apparatus shown in FIG. 12.

Figure 4:
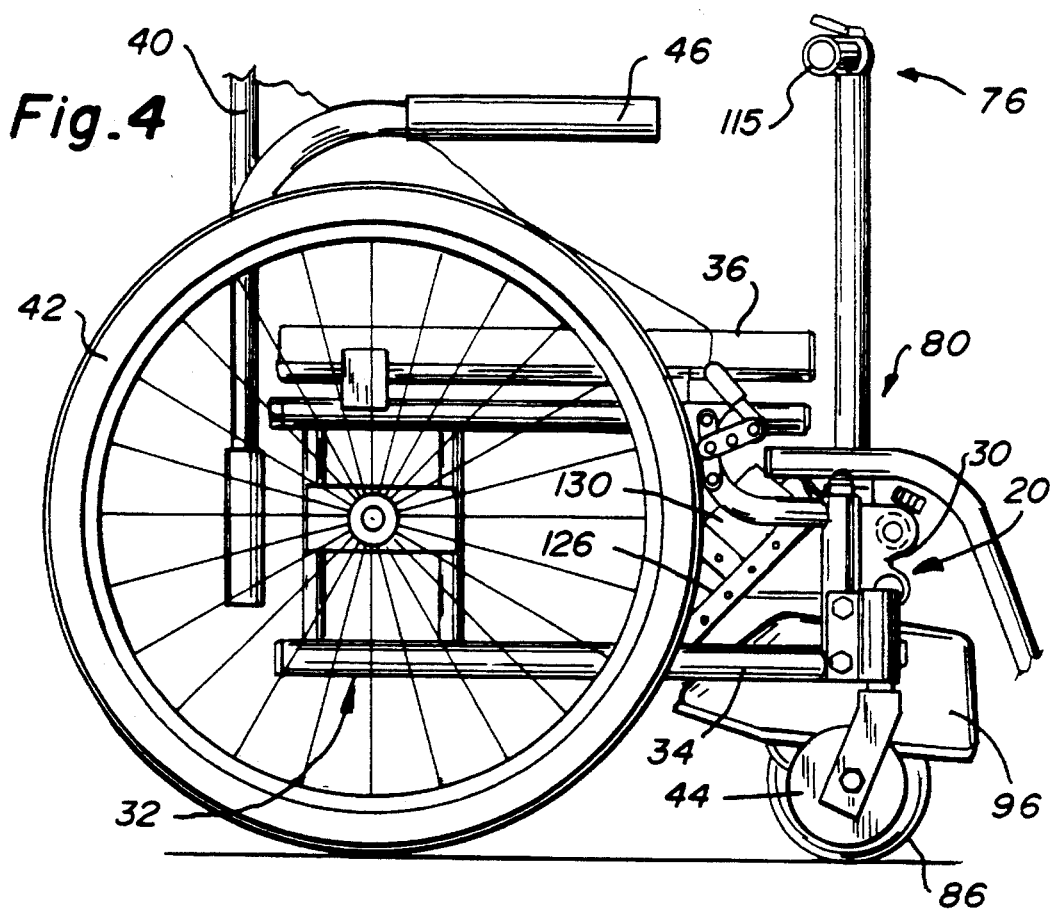
FIG. 4 is a side elevational view of the attachment apparatus shown in FIG. 1 installed on the wheelchair and receiving the motorized unit.
Figure 5:
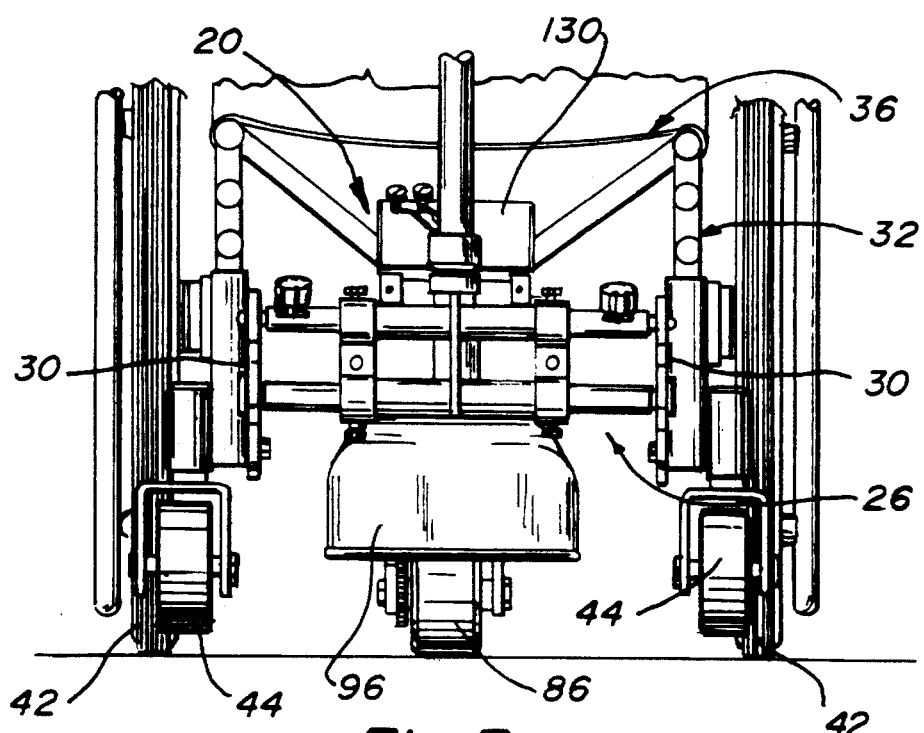
FIG. 5 is a front elevational view of the apparatus in FIG. 4.

FIG. 14. is an isometric view of an alternative embodiment showing a second mounting bracket mounted on a tubular portion of the frame of the wheelchair.

FIG. 15 is another isometric view of the apparatus shown in FIG. 14.

FIG. 16 is an exploded isometric view of the mounting frame and mounting brackets of the second embodiment.

FIG. 17 is a schematic of the drive components of the detachable motorized unit.

DESCRIPTION OF THE PREFERRED EMBODIMENT

The apparatus 20 of the present invention as best seen in FIGS. 2 and 3 is employed to attach a detachable motorized unit 22 to a wheelchair 24. The apparatus includes a mounting frame 26 detachably connected to the motorized unit and a pair of mounting brackets 30 attached to the wheelchair for supporting the mounting frame on the wheelchair. A first embodiment of the apparatus 20 is used for collapsible wheelchairs. A second embodiment of the apparatus, described later, is used for attachment of the detachable motorized unit to rigid, non-collapsible wheelchairs.

The collapsible wheelchair 24 (FIGS. 1 and 4) includes a frame 32 composed of a plurality of hollow tubular members 34. The frame supports a seat 36 and a seat back 40. The wheelchair frame 32 is supported by a pair of relatively large rear wheels 42 and a pair of relatively smaller front caster or idler wheels 44. For supporting the arms and legs of the occupant, a pair of arm rests 46 and foot rests 50 are conventionally mounted on the frame. An exemplary wheelchair is sold under the product designation QUICKIE II by Motion Design, Inc. of Fresno, Calif.

The pair of mounting brackets 30 (FIGS. 2, 3, 12 and 13) are mounted on the tubular frame 32 of the wheelchair 24. Each bracket 30 is preferably composed of a sturdy material such as aluminum, metal or plastic and is formed to define a plurality of openings therein. A circular opening 52 best seen in FIG. 3 and an oval or slot-shaped opening 54 receive mounting bolts 56 which are part of the mounting hardware for the front caster wheels 44 on the wheelchair 24. Each of the mounting brackets are held in place against the frame 32 of the wheelchair by a pair of nuts 60 threaded onto the bolts 56. The variability provided by the oval-shaped opening allows the mounting brackets to be used on a variety of differently-sized and configured collapsible wheelchairs.

For support of the mounting frame 26 of the apparatus 20, the mounting brackets 30 each include a slotted or C-shaped opening 62 defined in a front edge 64 of the brackets by an interior cam surface, as shown in FIG. 2. In addition, a second circular opening 66 is defined in each of the brackets 30 adjacent to a top edge 70 for further support of the mounting frame (FIG. 13). To facilitate support of the mounting frame 26, a laterally and inwardly extending lip 72 is formed on an inner side 74 of each of the mounting brackets 30 adjacent to the second circular opening. The lip 72 extends along approximately one-quarter of the periphery of the second circular opening 66.

The detachable motorized unit 22 (FIG. 3) includes a steering or control handle 76, a steering control rod assembly 80, and a power head 82 with a motor 84 (FIG. 17) and drive wheel 86. The motor 84 receives command signals from the control handle 76. As best seen in FIG. 17, the motor is linked to a gear assembly 90 by a timing drive belt 92. In turn, the gear assembly 90 is linked to the drive wheel 86 by a drive chain 94. Thus, activation of the motor results in rotation of the drive wheel in a conventional manner. Each of these drive components is mounted to and housed within a power head housing 96. A pair of battery lead wires 100 (FIG. 3), having battery connectors 102 at an end thereof, extend from the motor 84 through the housing 96 for connection to a battery as discussed below.

The control handle 76 is connected to the power head 82 by the steering control rod assembly 80. The control rod assembly 80 includes an upper tube 104 and a lower tube 106. The lower tube 106 is connected to the power head housing 96. The upper tube 104 is connected to the control handle 76 at its upper end 110. A lower end 111 of the upper tube 104 is bifurcated to form a key slot 113 for engagement with a complementary member (not shown) in the lower tube 106 so that the upper and lower tubes are pivotable in unison about their longitudinal axes. The upper tube is telescopically received in the open upper end 114 of the lower tube 106 and retained in position by a collar 112 and a set screw 117. Thus, by tightening or loosening the retaining collar 112, the upper tube can be connected to or disconnected from the lower tube.

The T-shaped control handle 76, connected to the upper end 110 of the upper tube 104 of the steering control rod assembly 80, is provided so that the operator can control the direction and speed of the detachable motorized unit 22 and thus of the wheelchair 24, when motorized. The control handle 76 includes a pair of hand grips 115 and a forward/reverse rocker switch 116. This switch 116 serves in a conventional way to control the activation and direction of rotation of the motor 84 discussed above. The detachable motorized unit 22 is available as part of a motorized wheelchair sold under the product designation AMIGO by Amigo Sales Inc. of Bridgeport, Mich.

Figure 11:
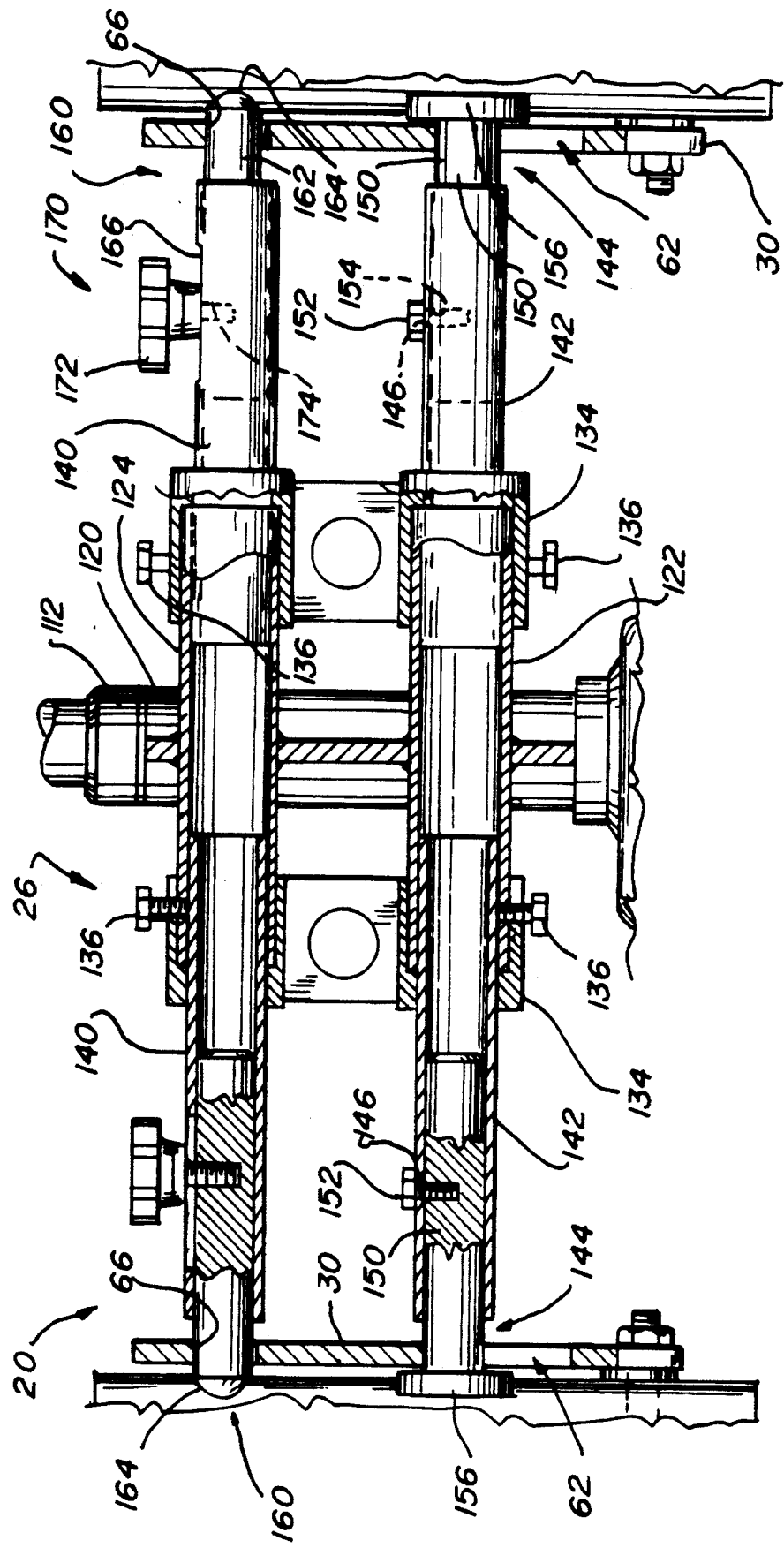
FIG. 11 is a fragmented section taken along line 11—11 of FIG. 4.

The mounting frame 26 (FIGS. 3 and 11) includes a hollow, vertical center support tube 120 for rotatably receiving the steering control rod assembly 80 of the detachable motorized unit 22. The center support tube 120 is connected to a pair of transverse lower and upper horizontal support tubes 122 and 124. Attached to as by welding and depending from the transverse support tubes 122 and 124 is a battery frame assembly 126. The battery frame assembly includes a base plate 127 supported by a plurality of extension arms 128 depending from the support tubes 122 and 124. For retaining a battery 129 within the frame assembly 126, a retaining strap is attached to the base plate 127. The battery connectors 102 on the ends of the battery lead wires 100 can be attached to a pair of terminals 132 on the battery 129.

For adjusting the width of the mounting frame 26 to allow the apparatus to be mounted on a variety of wheelchairs of various widths, a pair of support collars 134 are slidably received on each open end of the transverse support tubes 122 and 124. The support collars are adjustably affixed to the transverse support tubes by set screws 136. The screws 136 protrude through the support collar and associated transverse support tube 122 or 124 so as to be engagable with laterally adjustable sleeves 140 and 142 slidably received within the upper and lower support tubes respectively. There are a pair of the sleeves 140 associated with the support tube 124 and a pair of the sleeves 142 associated with the support tube 122 with the sleeves projecting out of the opposite open ends of the support tubes.

The adjustable sleeves 140 and 142 can be repositioned to different longitudinal positions as desired by loosening and tightening the set screws 136. Thus, the overall width of the mounting frame 26 can be adjusted while leaving the center support tube 120 centered between the sides of the wheelchair.

For engagement with and support by the mounting bracket 30, a fixed pin 144 is received within opposite open ends of the lower adjustable sleeve 142. The fixed pin includes a shaft 150 and an enlarged integral head 156 at a free end of the shaft. The fixed pin has a blind threaded radial hole 146 in its shaft 150 for receiving an attachment screw 152 protruding through an unthreaded hole 154 in the associated lower adjustable sleeve 142.

For selective engagement with the mounting bracket 30, a slide pin 160 protrudes from and is slidably received in each open end of the upper adjustable sleeve 140. Each slide pin includes a shaft 162 and a rounded head 164 on its free end. Each upper adjustable sleeve 140 has a longitudinal slot 166 along a top surface for receiving an adjustment screw 170 with a knob 172 on an end thereof. The screw 170 protrudes slidably through the longitudinal slot 166 and is threadedly received in a radial blind hole 174 in the slide pin 160. By tightening the screw 170, the slide pin can be longitudinally fixed within the upper adjustable sleeve. Conversely, upon loosening the screw 170, the slide pin can be repositioned longitudinally within the adjustable sleeve 140. Thus, the slide pin can be selectively moved into and out of operative engagement with the mounting bracket 30. Alternatively, the screw 170 could be replaced with a spring-biased locking device (not shown).

For facilitating the connection of the detachable motorized unit 22 to the wheelchair 24, an installation handle 176 is provided (FIGS. 6–10). The L-shaped installation handle 176 can be inserted into the open upper end 114 of the lower tube 106 of the steering control rod assembly 80, after the upper tube 104 has been removed. A grip portion 180 of the installation handle is provided as a lever arm for installation of the detachable motorized unit 22.

As shown sequentially in FIGS. 6–10, the detachable motorized unit 22, with the installation handle 176 inserted, is brought into proximity with the front of the wheel chair 24. The slide pins 160 in each of the upper width adjustable sleeves 140 are first placed in the retracted position. The fixed pins 144 of the lower width adjustable sleeves 142 are placed in the C-shaped opening 62 of the mounting brackets 30 (FIG. 6). The motorized unit 22 is thus supported by its drive wheel 86 with the fixed pins 144 bearing against a bottom surface 182 of the C-shaped opening 62. This operation can be easily accomplished by the occupant in the wheelchair.

Figure 9:
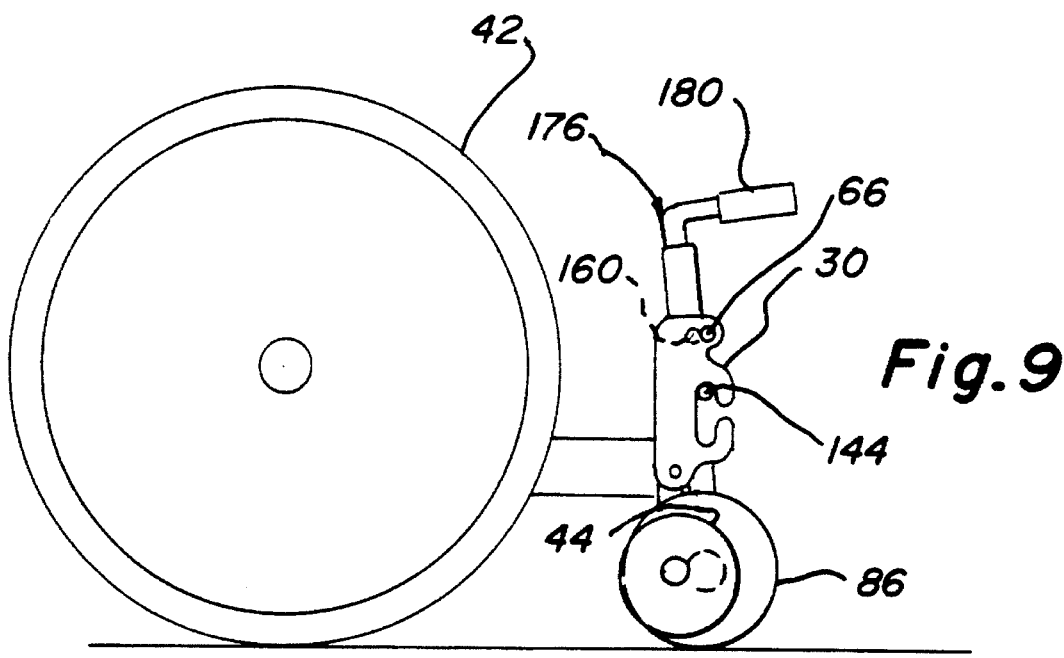
FIG. 9 is a schematic of the apparatus shown in FIG. 4 showing further actuation of the installation handle to begin to lift a front wheel of the wheelchair off the ground.
Figure 10:
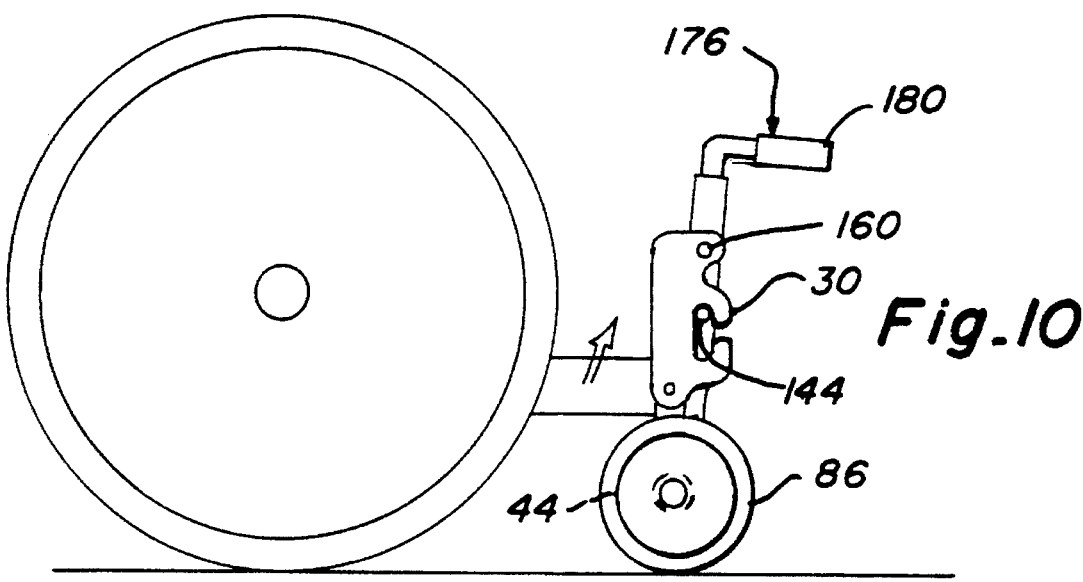
FIG. 10 is a schematic of the apparatus shown in FIG. 4 showing further actuation of the installation handle to align a slide pin of the mounting frame with an opening formed in the mounting bracket.

Next, the occupant pivots the detachable motorized unit 22 by applying a downward and forward force to the grip portion 180 of the installation handle 176. As the unit is pivoted clockwise as viewed in FIGS. 6–10, the fixed pin slides along the cam surface from the bottom surface 182 of the opening 62 along a side surface 184 and into engagement with a top surface 186 of the C-shaped opening (FIGS. 7 and 8). As the operator continues to pivot the motorized unit by applying downward force on the grip portion 180, the front caster wheels 44 of the wheelchair 24 are lifted off the supporting surface (FIG. 9). The wheelchair is now supported by the rear wheels 42 and the drive wheel 86 of the detachable motorized unit 22, through the cooperative action of the mounting bracket 30 and the mounting frame 26. The operator continues to pivot the motorized unit until the rounded end 164 of the retracted slide pin 160 contacts the protruding lip 72 formed on the inner side 74 of the mounting brackets 30 (FIGS. 10 and 13). At this point, the retracted slide pins can be repositioned longitudinally and locked in position with knobs 172 so that the pins protrude through and engage with the second circular openings 66 formed in the mounting brackets 30. Thus, the mounting frame 26 is now securely attached to the mounting brackets 30 and in turn to the wheelchair 24.

Before or after the motorized unit is positioned and attached to the wheelchair as described above, the occupant can slide the battery 129 into the battery frame assembly 126 (FIG. 3) so that the battery connectors 102 of the battery lead wires 100 can be attached to the battery terminals 132. Once the installation handle 176 is removed from the lower tube 106, the upper tube 104 of the steering control rod assembly 80 can be inserted. The motorized wheelchair is then ready for operation.

To disconnect the motorized unit 22 from the wheelchair 24, the occupant reverses the above-described procedure (FIGS. 6–10). The upper tube 104 of the steering control rod assembly 80 is removed from the lower tube 106 and replaced with the installation handle 176. After loosening the knobs 172, the slide pins 160 are retracted out of engagement with the second circular opening 66 of the mounting brackets 30. The operator then applies an upward force to the grip portion 180 of the installation handle 176 so as to pivot the motorized unit and return the front caster wheels 44 of the wheelchair 24 into engagement with the support surface. As the motorized unit continues to be pivoted, the fixed pins 144 of the mounting frame 26 slide along the side surface 184 of the C-shaped opening 62 and into engagement with the bottom surface 182 thereof. The fixed pins can then be lifted out of the C-shaped opening to completely disconnect the motorized unit from the wheelchair.

A second embodiment 188 of the mounting frame and mounting brackets for use with a rigid, non-collapsible wheelchair is shown in FIGS. 14–16. Similar components from the first embodiment are shown with a prime (') denotation. Mounting brackets 190 affixed to the wheelchair frame at laterally spaced locations include a C-shaped opening 62', an intermediate slot-shaped opening 54' and upper and lower circular openings 66' and 52', respectively. Each of the mounting brackets 190 is attached to the wheelchair 24 via a frame clamp 194. The frame clamp 194 includes a pair of confronting U-shaped members 196 clamped to a hollow tubular portion of the frame 32 of the wheelchair 24. Bolts 56' extend through the U-shaped members 196 and through the lower and intermediate openings 52' and 54' of the mounting bracket 190. The bolts are retained in place by a pair of nuts 60'. The mounting bracket includes a protruding lip 72' formed adjacent to the upper circular opening 66'.

The second embodiment 200 of the mounting frame includes a center support tube 120' and a pair of transverse support tubes 122' and 124'. The support tubes are supported on the rear side of the center support tube 120' by a bracket 202. Other than this opposite mounting of the support tubes to the center support tube, the mounting frame 200 is substantially identical to the first embodiment 26 of the mounting frame. Connection and disconnection of the motorized unit 22 to the wheelchair 24 using the mounting frame 200 and mounting bracket 190 is identical to that of the mounting frame 26 and mounting brackets 30 described above.

A presently preferred embodiment of the present invention has been described above with a degree of specificity.

It should be understood, however, that this degree of specificity is directed toward the preferred embodiment. The invention itself, however, is defined by the scope of the appended claims.

The invention claimed is:

1. An apparatus for attaching a drive wheel to a wheelchair, said wheelchair including a frame having a width dimension, a pair of manually-driven wheels rotatably mounted on the frame, said wheelchair supported by a support surface, said apparatus comprising:
   a mounting bracket adapted for attachment to the frame of the wheelchair, said bracket defining an open slot, said slot having an interior cam surface and being open on a front side and enclosed on bottom, back and top sides thereof;
   a mounting frame substantially the same width as the wheelchair frame and being operatively connected to the drive wheel, said frame having a laterally-extending member, wherein said laterally-extending member is positionable within said slot; and
   said laterally-extending member bears against said interior cam surface when said mounting frame and drive wheel are pivoted about said laterally-extending member.

2. An apparatus as defined in claim 1 wherein said slot is C-shaped.

3. An apparatus as defined in claim 1 wherein said mounting frame further includes width adjusting means for selectively varying and adjusting the width of the frame to accommodate a variety of different wheelchairs.

4. An apparatus as defined in claim 1 wherein said frame has a second laterally-extending member, said apparatus further including:
   a second mounting bracket operatively connected to the frame of the wheel chair, said bracket defining an open slot for receiving said second laterally extending member, said slot defining an interior cam surface and being open on a front side thereof and enclosed on bottom, back and top sides thereof.

5. An apparatus as defined in claim 1 wherein the laterally extending member of the mounting frame includes a pin extending from an end of the mounting frame.

6. An apparatus as defined in claim 1 wherein said laterally extending member of the mounting frame is a pin extending from the mounting frame and further including:
   a second pin extending from the mounting frame and selectively engagable with the bracket.

7. An apparatus as defined in claim 6 wherein said mounting bracket defines a circular opening therein for receiving said second pin and further wherein said second pin is selectively slidable within the mounting frame so as to be positioned in a retracted position and an extended position in engagement with the mounting bracket.

8. An apparatus as defined in claim 1 wherein said mounting frame further includes:
   a center support tube for receiving and connecting with the motorized wheel; and
   a pair of transverse support tubes attached to the center support tube, the transverse support tubes including the cylindrical member for engagement with the mounting bracket.

9. An apparatus as defined in claim 1, further including a battery frame attached to the mounting frame for receiving a battery.

10. An apparatus as defined in claim 1 wherein said motorized wheel includes a selectively removable control handle adapted to control the movement of the motorized wheel, said apparatus further including an installation handle adapted for engagement with the motorized wheel for use as a lever to install the motorized wheel and mounting frame onto the wheelchair.

11. An apparatus for attaching a drive wheel to a wheelchair, said wheelchair including a frame, a pair of manually-driven wheels rotatably mounted on the frame, and at least one idler wheel mounted on the frame, said apparatus comprising:
   a first mounting bracket adapted for mounting on the frame of the wheelchair, said first bracket defining a C-shaped open slot, said slot defining an interior cam surface and being open on a front side thereof and enclosed on bottom, back and top sides thereof and said first bracket further defining an opening;
   a second mounting bracket adapted for mounting on the frame of the wheel chair, said second bracket defining a C-shaped open slot, said slot defining an interior cam surface and being open on a front side thereof and enclosed on bottom, back and top sides thereof and said second bracket further defining an opening;
   a mounting frame adapted for mounting on the motorized wheel, said frame having first and second laterally-extending fixed pins and corresponding first and second laterally-extending slidable pins; and
   said first fixed pin being received in said C-shaped open slot defined by said first mounting bracket, said second fixed pin being received in said C-shaped open slot defined by said second mounting bracket, said first laterally-extending slidable pin being releasably received in said opening defined by said first bracket, and second laterally-extending slidable pin being releasably received in said opening defined by said second bracket.

12. An apparatus as defined in claim 11 wherein said mounting frame further includes width adjusting means for selectively varying and adjusting the width of the frame to accommodate a variety of different wheelchairs.

13. An apparatus as defined in claim 11, wherein said mounting frame is substantially the same width as the wheelchair frame.

14. A wheelchair with a detachable motorized wheel supported by a support surface, said wheelchair comprising:
   a wheelchair frame;
   a seat attached to the wheelchair frame;
   a pair of manually-driven wheels rotatably mounted on the wheelchair frame;
   at least one idler wheel mounted on the wheelchair frame so as to be rotatable both about its rotational axis and about a vertical axis;
   a motorized wheel;
   a mounting frame operatively connected to the motorized wheel, said frame having a laterally-extending member; and
   a mounting bracket operatively connected to the frame of the wheel chair, said bracket defining an open slot for receiving said member, said slot defining an interior cam surface and being open on a front side thereof and enclosed on bottom, back and top sides thereof;
   whereby when said mounting frame and motorized wheel are pivoted about said laterally-extending cylindrical member, said member bears against said interior cam surface to lift the at least one idler wheel off the support surface so that the wheelchair is supported by the pair of manually-driven wheels and the motorized wheel.

15. A method for mounting a motorized wheel to a frame of a wheelchair having two rear manually-driven wheels and at least one idler wheel with a mounting frame attached to the motorized wheel, said mounting frame including a first and a second laterally-extending member, and a mounting bracket attached to the wheelchair frame, said mounting bracket having an interior cam surface and a receptacle, the method comprising the steps of:

positioning the motorized wheel relative to the wheelchair so that the first member of the mounting frame engages the cam surface of the mounting bracket;

pivoting the motorized wheel and mounting frame about the first member until the second member is aligned with and in position for engagement with the receptacle on the mounting bracket; and engaging the receptacle with the second member to attach the motorized wheel to the wheelchair.

16. A method as defined in claim 15 wherein an installation handle is provided for selective attachment to the motorized wheel and wherein the pivoting step includes actuating the extension handle to pivot the motorized wheel.

17. A method as defined in claim 15 wherein the pivoting step further includes sliding the first member along the cam surface of the bracket to transfer the weightbearing support of the wheelchair from the at least one idler wheel to the motorized wheel.

18. A method as defined in claim 15 wherein the engaging step further includes extending the second member longitudinally from a retracted position to an extended position to engage the receptacle.

19. A method as defined in claim 15 wherein the mounting frame further includes a battery bracket for selectively receiving a battery, the method further including the subsequent step of:

inserting the battery into the battery bracket.

20. An apparatus for attaching a drive wheel to a wheelchair, said wheelchair including a frame, a pair of manually-driven wheels rotatably mounted on the frame, said wheelchair supported by a support surface, said apparatus comprising:

a mounting bracket adapted for attachment to the frame of the wheelchair, said bracket defining an open slot, said slot having an interior cam surface and being open on a front side and enclosed on bottom, back and top sides thereof;

a mounting frame operatively connected to the drive wheel, said frame having a laterally-extending member, wherein said laterally-extending member is positionable within said slot, and said mounting frame further including a width adjusting means for selectively varying and adjusting the width of the frame to accommodate a variety of different wheelchairs; and said laterally-extending member bears against said interior cam surface when said mounting frame and drive wheel are pivoted about said laterally-extending member.

21. An apparatus as defined in claim 20 wherein said width adjusting means includes a support collar and a width adjusting screw which can longitudinally fix the position of a width adjusting sleeve received within the support collar.

22. An apparatus for attaching a drive wheel to a wheelchair, said wheelchair including a frame, a pair of manually-driven wheels rotatably mounted on the frame, said wheelchair supported by a support surface, said apparatus comprising:

at least two mounting brackets adapted for attachment to the frame of the wheelchair, each of said brackets defining an open slot, said slot having an interior cam surface and being open on a front side and enclosed on bottom, back and top sides thereof;

a mounting frame operatively connected to the drive wheel, said frame having at least two laterally-extending members, wherein said laterally-extending members are positionable within said slot; and said laterally-extending members bear against said interior cam surface when said mounting frame and drive wheel are pivoted about said laterally-extending member.

23. An apparatus for attaching a drive wheel to a wheelchair, said wheelchair including a frame, a pair of manually-driven wheels rotatably mounted on the frame, said wheelchair supported by a support surface, said apparatus comprising:

a mounting bracket adapted for attachment to the frame of the wheelchair, said bracket defining an open slot, said slot having an interior cam surface and being open on a front side and enclosed on bottom, back and top sides thereof, said mounting bracket further defining a circular opening therein;

a mounting frame operatively connected to the drive wheel, said frame having a laterally-extending member, wherein said laterally-extending member is positionable within said slot; and said laterally-extending member bearing against said interior cam surface when said mounting frame and drive wheel are pivoted about said laterally-extending member, said laterally-extending member of the mounting frame being a pin extending from the mounting frame;

and a second pin extending from the mounting frame and selectively engaging the opening in the bracket, and wherein said second pin is selectively slidable within the mounting frame so as to be moveable between a retracted position and an extended position in engagement with the mounting bracket.

24. An apparatus as defined in claim 23 wherein said mounting bracket forms a raised lip along the periphery of the circular opening.

25. An apparatus as defined in claim 24 wherein said raised lip extends along one-quarter of the periphery of the circular opening.

26. An apparatus as defined in claim 23, further including a locking means on the slidable pin for locking the slidable pin in position within the mounting frame at selective longitudinal positions.

27. An apparatus as defined in claim 26 wherein said mounting frame forms a longitudinal slot to receive said locking means.

28. An apparatus as defined in claim 27 wherein said locking means includes a screw with a knob on an end thereof.

29. An apparatus for attaching a drive wheel to a wheelchair, said wheelchair including a frame, a pair of manually-driven wheels rotatably mounted on the frame, said wheelchair supported by a support surface, said apparatus comprising:

a mounting bracket adapted for attachment to the frame of the wheelchair, said bracket defining an open slot, said slot having an interior cam surface and being open on a front side and enclosed on bottom, back and top sides thereof;

a mounting frame being operatively connected to the drive wheel, said mounting frame including a center support tube for receiving and connecting with the drive wheel; and a pair of transverse support tubes attached to the center support tube, the transverse support tubes including the cylindrical member for engagement with the mounting bracket; and said laterally-extending member bears against said interior cam surface when said mounting frame and drive wheel are pivoted about said laterally-extending member.

30. An apparatus as defined in claim 29, further including a pair of support collars, one on either end of the transverse support tubes;

a pair of lower width adjustable sleeves received within the lower of the transverse support tubes and retained in position by the support collar;

a pair of upper width adjustable sleeves, one received within each of the upper transverse support tubes and retained within the support collar;

a pair of fixed pins, one received and held within each of the lower width adjustable sleeves, the fixed pins having an enlarged head on an end thereof; and a pair of slide pins, one received and held within each of the upper width adjustable sleeves, each slide pin having an adjustment screw associated therewith for tracking and extending the slide pin from the upper width adjustable sleeve.

31. A method for mounting a motorized wheel to a frame of a wheelchair having two rear manually-driven wheels and at least one idler wheel with a mounting frame attached to the motorized wheel, said mounting frame including a first and a second laterally-extending cylindrical members, and a mounting bracket attached to the wheelchair frame, said mounting bracket having an interior cam surface and a receptacle, the method comprising the steps of:

positioning the motorized wheel relative to the wheelchair so that the first cylindrical member of the mounting frame engages the cam surface of the mounting bracket;

providing an installation handle for selective attachment to the drive wheel;

actuating the extension handle to pivot the drive wheel and mounting frame about the first cylindrical member until the second cylindrical member is aligned with and in position for engagement with the receptacle on the mounting bracket; and engaging the receptacle with the second cylindrical member to attach the motorized wheel to the wheelchair.

32. A method as defined in claim 31, further comprising the steps of:

inserting the installation handle into the motorized wheelchair before the pivoting step; and removing the installation handle from the motorized wheelchair after the pivoting and engaging steps.

33. A method as defined in claim 32, further comprising the step of:

inserting an operating handle into the motorized wheelchair after the removing step.

34. A method for mounting a motorized wheel to a frame of a wheelchair having two rear manually-driven wheels and at least one idler wheel with a mounting frame attached to the motorized wheel, said mounting frame including a first and a second laterally-extending member, and a mounting bracket attached to the wheelchair frame, said mounting bracket having an interior cam surface and a receptacle, the method comprising the steps of:

positioning the motorized wheel relative to the wheelchair so that the first cylindrical member of the mounting frame engages the cam surface of the mounting bracket;

pivoting the motorized wheel and mounting frame about the first cylindrical member until the second cylindrical member is aligned with and in position for engagement with the receptacle on the mounting bracket;

extending the second member longitudinally from a retracted position to an extended position; and engaging the receptacle with the second member to attach the motorized wheel to the wheelchair.

* * * * *